United States Patent
Wald et al.

(10) Patent No.: US 8,343,682 B2
(45) Date of Patent: *Jan. 1, 2013

(54) MEMBRANE ELECTRODE ASSEMBLY WITH COMPRESSION CONTROL GASKET

(75) Inventors: David Allen Wald, Lakeland, MN (US); Michael Andrew Yandrasits, Hastings, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 1142 days.

This patent is subject to a terminal disclaimer.

(21) Appl. No.: 11/696,210

(22) Filed: Apr. 4, 2007

(65) Prior Publication Data
US 2007/0178354 A1    Aug. 2, 2007

Related U.S. Application Data

(62) Division of application No. 10/150,473, filed on May 17, 2002, now Pat. No. 7,217,471.

(51) Int. Cl.
*H01M 2/08* (2006.01)
*H01M 2/14* (2006.01)
*H01M 4/82* (2006.01)

(52) U.S. Cl. .................. 429/463; 429/507; 29/623.2
(58) Field of Classification Search .............. 429/463, 429/507; 29/623.2
See application file for complete search history.

(56) References Cited

U.S. PATENT DOCUMENTS

| | | | |
|---|---|---|---|
| 4,721,555 A | 1/1988 | Grosshandler | |
| 5,264,299 A | 11/1993 | Krasij et al. | |
| 5,441,621 A | 8/1995 | Molter et al. | |
| 5,464,700 A | 11/1995 | Steck et al. | |
| 5,928,807 A | 7/1999 | Elias | |
| 6,057,054 A | 5/2000 | Barton et al. | |

(Continued)

FOREIGN PATENT DOCUMENTS
EP    0 940 868 A2    9/1999
(Continued)

*Primary Examiner* — Karie O'Neill Apicella
(74) *Attorney, Agent, or Firm* — Philip Y. Dahl

(57) ABSTRACT

A method is provided for making a gasketed fuel cell membrane electrode assembly (MEA) comprising the steps of: i) selecting a fluid transport layer sheet material; ii) selecting a target level of compression Ct % for use of said fluid transport layer sheet material in a fuel cell membrane electrode assembly; iii) measuring the pressure Pt for which the fluid transport layer sheet material achieves compression of Ct %; iv) positioning between the platens of a press a membrane electrode assembly comprising: a) a polymer electrolyte membrane; b) an anode catalyst material; c) a cathode catalyst material; d) an anode-side fluid transport layer comprising the selected fluid transport layer sheet material; and e) a cathode-side fluid transport layer comprising the selected fluid transport layer sheet material; v) depositing a gasket material in the outer edge portions of the anode and cathode faces of the polymer electrolyte membrane; vi) compressing the membrane electrode assembly to a pressing pressure Pp which is between 90% and 110% of Pt; and vii) substantially fixing the gasket material so as to form a gasketed fuel cell membrane electrode assembly. An MEA is provided comprising the layers listed above wherein the average thickness of each gasket Tg under its contact face is between 110% and 90% of {Tf× (100%−Ct %)}, where Tf is the average thickness of the respective same-side fluid transport layer.

40 Claims, 2 Drawing Sheets

U.S. PATENT DOCUMENTS

| | | | |
|---|---|---|---|
| 6,080,503 A | 6/2000 | Schmid et al. | |
| 6,159,628 A | 12/2000 | Grasso et al. | |
| 6,174,616 B1 | 1/2001 | Marvin et al. | |
| 6,261,711 B1 | 7/2001 | Matlock et al. | |
| 6,337,120 B1 | 1/2002 | Sasaki et al. | |
| 7,087,339 B2 | 8/2006 | Wald et al. | |
| 7,217,471 B2 | 5/2007 | Wald et al. | |
| 2001/0019790 A1 | 9/2001 | Regan et al. | |
| 2001/0019791 A1 | 9/2001 | Gooch et al. | |
| 2002/0034670 A1 | 3/2002 | Suenaga et al. | |
| 2003/0104262 A1 * | 6/2003 | Kuroki et al. | 429/36 |

FOREIGN PATENT DOCUMENTS

| | | |
|---|---|---|
| EP | 1 083 616 A2 | 3/2001 |
| EP | 1 156 546 A1 | 11/2001 |
| EP | 0 833 400 B1 | 8/2005 |
| JP | 05-242897 | 9/1993 |
| JP | 09-097619 | 4/1997 |
| JP | 2003-317793 | 11/2003 |
| WO | WO 96/37920 | 11/1996 |
| WO | WO 02/01658 | 1/2002 |
| WO | WO 02/01658 A1 * | 1/2002 |

* cited by examiner

MEMBRANE ELECTRODE ASSEMBLY WITH COMPRESSION CONTROL GASKET

CROSS REFERENCE TO RELATED APPLICATION

This application is a divisional of U.S. Ser. No. 10/150,473, filed May 17, 2002 now U.S. Pat. No. 7,217,471, now allowed, the disclosure of which is herein incorporated by reference.

FIELD OF THE INVENTION

This invention relates to a method of making a gasketed membrane electrode assembly (MEA), typically for use in a fuel cell, where the height of each gasket is optimized to the characteristics of it's neighboring fluid transport layer (FTL).

BACKGROUND OF THE INVENTION

U.S. 2002/0,034,670 discloses a seal for sealing a membrane electrode assembly wherein the difference in height between the seal and the gas diffusion layer of the MEA is constant. The reference also discloses a method for forming a seal by injection molding wherein an MEA is placed in a forming die held under a fixed pressure and the seal material is charged into the cavity.

U.S. 2001/0,019,790 and U.S. 2001/0,019,791 disclose a fuel cell comprising a multi-lobe gasket which may be molded to a polymer electrolyte membrane.

U.S. Pat. No. 6,337,120 discloses a gasket formed into a groove of a sheet material.

U.S. Pat. No. 6,261,711 discloses a seal for a fuel cell which includes a gasket disposed within a groove in a fuel cell flow plate.

U.S. Pat. No. 6,159,628 discloses a fuel cell including porous substrates impregnated at their periphery with a thermoplastic material.

U.S. Pat. No. 6,080,503 discloses a fuel cell wherein a MEA is adhesively bound to one or more separator plates.

U.S. Pat. No. 6,057,054 discloses, in some embodiments, an MEA having co-extensive polymer electrolyte membrane and porous electrode layers having a seal material such as silicone impregnated into the porous electrode layers. The reference discloses, in other embodiments, an MEA having a seal material impregnated into the porous electrode layers thereof, where the seal extends beyond the MEA. The seal may include a pattern of ribs and cross-ribs.

U.S. Pat. No. 5,928,807 discloses a polymer electrolyte fuel cell including an elastic, plastically deformable and electrically conductive graphite seal.

U.S. Pat. No. 5,464,700 discloses a gasketing system for a fuel cell membrane electrode assembly (MEA) intended to minimize the amount of polymer electrolyte membrane material in the fuel cell by employing a gasketing material instead of polymer electrolyte membrane material at the periphery.

U.S. Pat. No. 5,441,621 discloses a sealing surface for fuel cell use which has a "crossed-ridge" pattern, and in particular a "crossed-ridge" pattern which forms square cells. The reference discloses a rigid cell frame embodying the crossed-ridge sealing surface.

U.S. Pat. No. 5,264,299 discloses a porous support body for use in an MEA having a peripheral portion filled with elastomeric material.

U.S. Pat. No. 4,721,555 discloses a solid seal means to be interposed between electrode frame members of an electrolysis cell. The reference describes electrolysis cells with an internal separator, such as color-alkali cells depicted in FIGS. 17 and 18, and electrolysis cells without an internal separator, such as a chlorate cells. FIGS. 8 and 9 disclose hexagonal patterns.

SUMMARY OF THE INVENTION

Briefly, the present invention provides a method of making a gasketed fuel cell membrane electrode assembly comprising the steps of: i) selecting a fluid transport layer sheet material; ii) selecting Ct % for said fluid transport layer sheet material, wherein C % is compression in thickness of said fluid transport layer sheet material as a percent of uncompressed thickness and Ct % is the target level of C % during use of said fluid transport layer sheet material in a fuel cell membrane electrode assembly; iii) measuring the pressure Pt for which said fluid transport layer sheet material achieves compression of Ct %; iv) positioning between the platens of a press a membrane electrode assembly comprising: a) a polymer electrolyte membrane; b) an anode catalyst material; c) a cathode catalyst material; d) an anode-side fluid transport layer comprising the selected fluid transport layer sheet material; and e) a cathode-side fluid transport layer comprising the selected fluid transport layer sheet material; v) depositing a gasket material in the outer edge portions of the anode and cathode faces of the polymer electrolyte membrane; vi) compressing the membrane electrode assembly to a pressing pressure Pp which is between 90% and 110% of Pt; and vii) substantially fixing said gasket material so as to form a gasketed fuel cell membrane electrode assembly. More typically, pressing pressure Pp is between 95% and 105% of Pt. Typically, the method also comprises the step of: viii) positioning one or two patterning plates, which bear a negative relief of a raised-ridge microstructured contact pattern, between one or both platens of the press and the gasket material. The raised-ridge microstructured contact patterns typically comprise ridges which meet at joining points wherein no more than three ridges meet at any one joining point, such as hexagonal and degenerate hexagonal patterns. The gasket material typically comprises material selected from: ethylene propylene diene monomer rubber (EPDM rubber), butyl rubber, and most typically silicone.

In another aspect, the present invention provides an MEA comprising a) a polymer electrolyte membrane, b) an anode catalyst material; c) a cathode catalyst material; d) an anode-side fluid transport layer comprising a fluid transport layer sheet material, e) a cathode-side fluid transport layer comprising said fluid transport layer sheet material; f) an anode-side gasket having a contact face; and g) a cathode-side gasket having a contact face; where the fluid transport layer sheet material is characterized by a target compression Ct %; wherein the average thickness of each gasket Tg under its contact face is between 110% and 90% of $\{Tf \times (100\% - Ct\%)\}$, where Tf is the average thickness of the respective same-side fluid transport layer. In one embodiment, contact faces of the gaskets bear raised-ridge microstructured contact patterns typically comprising ridges which meet at joining points wherein no more than three ridges meet at any one joining point, such as hexagonal and degenerate hexagonal patterns. The gaskets typically comprise material selected from: ethylene propylene diene monomer rubber (EPDM rubber), butyl rubber, and most typically silicone.

What has not been described in the art, and is provided by the present invention, is an MEA and a method of making an MEA, where the MEA will achieve optimal compression of FTL layers during use in a fuel cell stack under a wide range of applied pressures beyond optimal pressures and in spite of variation in FTL thickness from one MEA to the next, by providing that the difference in height between the gasket and the FTL of the MEA varies with applied pressure until the optimal FTL height is achieved.

In this application:

"compression," represented as C %, is expressed as the reduction in thickness of a compressed fluid transport layer sheet material as a percent of uncompressed thickness, e.g., a layer having uncompressed thickness of 500 micrometers has a compression of 10% when compressed to 450 micrometers;

"microstructured" means, with reference to a pattern of ridges, substantially composed of ridges having a width of less than 1,000 micrometers, more typically less than 600 micrometers, and most typically less than 300 micrometers, and having a depth (height) of no more than 250 micrometers, more typically less than 150 micrometers, and most typically less than 100 micrometers;

"hexagonal pattern" means a pattern of ridges substantially according to the rule that no more than three ridges meet at one point, which chiefly comprises 6-sided (hexagonal) cells, such as depicted in FIGS. 3a and 3b, and which may include incomplete cells in edge areas;

"degenerate hexagonal pattern" means a pattern of ridges substantially according to the rule that no more than three ridges meet at one point, which chiefly comprises 3-, 4- or 5-sided cells that may be derived from 6-sided (hexagonal) cells by making parallel two or more consecutive sides of a 6-sided (hexagonal) cell, such as depicted in FIGS. 4a and 4b, and which may include incomplete cells in edge areas;

"integral gasket" means, with reference to an MEA, a gasket bound to the polymer electrolyte membrane of the MEA, the fluid transport layer of the MEA, or both, and most typically a gasket comprising gasket material which impregnates the fluid transport layer of the MEA.

It is an advantage of the present invention to provide a method of making an MEA which provides an MEA which will achieve optimal compression of the FTL layer of the MEA during use in a fuel cell stack under a wide range of applied pressures and in spite of variation in FTL thickness from one MEA to the next. It is an advantage of the present invention to provide an MEA wherein the difference in height between the gasket and the FTL of the MEA varies with applied pressure, until the optimal FTL height is achieved. It is an advantage of the present invention to avoid the drawbacks of injection molding, including the necessity of machining complex molds, the step of aligning the MEA components in the mold, and the step of removing the molded article from the mold.

DETAILED DESCRIPTION OF PREFERRED EMBODIMENTS

Figure 1:
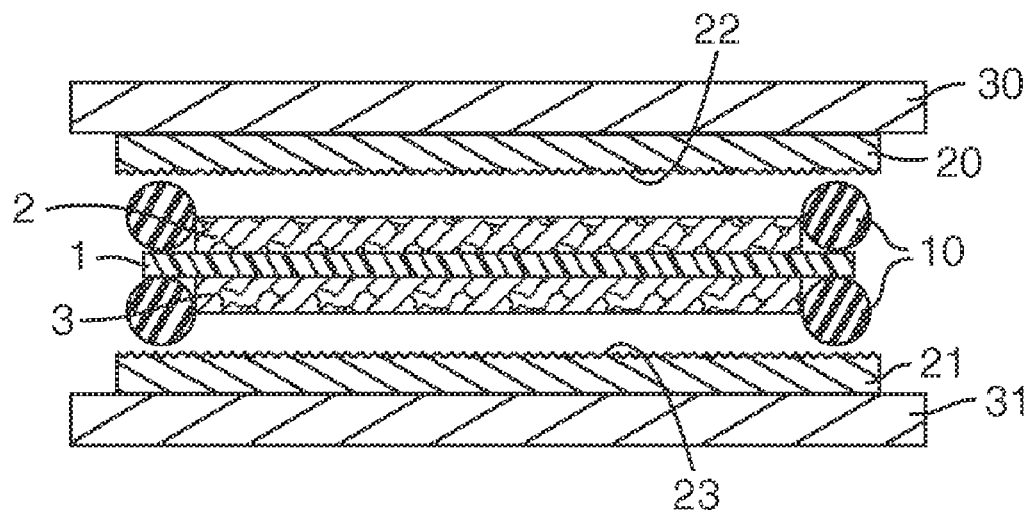
FIG. 1 is a schematic depiction of a cross-section of a membrane electrode assembly prior to pressing according to the method of the present invention.

The present invention provides, in one respect, a method of making a membrane electrode assembly (MEA) for use in a fuel cell which has an integral gasket, where the height of each gasket is optimized to the characteristics of it's neighboring fluid transport layer (FTL).

A membrane electrode assembly (MEA) is the central element of proton exchange membrane fuel cells such as hydrogen fuel cells. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. Fluid transport layers (FTL's) facilitate gas transport to and from the anode and cathode electrode materials and conduct electrical current. In a typical PEM fuel cell, protons are formed at the anode via hydrogen oxidation and transported to the cathode to react with oxygen, allowing electrical current to flow in an external circuit connecting the electrodes. The FTL may also be called a gas diffusion layer (GDL) or a diffuser/current collector (DCC). The anode and cathode electrode layers may be applied to the PEM or to the FTL during manufacture, so long as they are disposed between PEM and FTL in the completed MEA.

Any suitable PEM may be used in the practice of the present invention. The PEM typically has a thickness of less than 50 μm, more typically less than 40 μm, more typically less than 30 μm, and most typically about 25 μm. The PEM is typically comprised of a polymer electrolyte that is an acid-functional fluoropolymer, such as Nafion® (DuPont Chemicals, Wilmington Del.) and Flemion™ (Asahi Glass Co. Ltd., Tokyo, Japan). The polymer electrolytes useful in the present invention are typically copolymers of tetrafluoroethylene and one or more fluorinated, acid-functional comonomers. Typically the polymer electrolyte bears sulfonate functional groups. Most typically the polymer electrolyte is Nafion®. The polymer electrolyte typically has an acid equivalent weight of 1200 or less, more typically 1100 or less, more typically 1050 or less, and most typically about 1000.

Any suitable FTL may be used in the practice of the present invention. Typically the FTL is comprised of sheet material comprising carbon fibers. Typically the FTL is a carbon fiber construction selected from woven and non-woven carbon fiber constructions. Carbon fiber constructions which may be useful in the practice of the present invention may include: Toray™ Carbon Paper, SpectraCarb™ Carbon Paper, AFN™ non-woven carbon cloth, Zoltek™ Carbon Cloth, and the like. The FTL may be coated or impregnated with various materials, including carbon particle coatings, hydrophilizing treatments, and hydrophobizing treatments such as coating with polytetrafluoroethylene (PTFE). Treatments which do not substantially effect the mechanical properties of the FTL sheet material may occur before or after determination of target compression, Ct %, described following.

During use in a fuel cell the FTL will be under compressive pressure. This pressure must be sufficient to provide good electrical contact between the FTL and adjacent current-conducting plates, known as end plates or bipolar plates. However, this pressure must not be so great as to restrict the flow of fluids in the FTL or cause crushing damage to the material of the FTL. For any given fluid transport layer sheet material there can be determined an optimal degree of compression C %, expressed as the compression in thickness of the FTL sheet material as a percent of uncompressed thickness. This target compression, Ct %, may be determined by any suitable method that balances the competing interests of electrical and fluid conductivity. For a given fluid transport layer sheet material, a target pressure Pt can then be measured by determining what pressure or range of pressures will compress the FTL sheet material to the target compression Ct %. It will be understood that, in the practice of the present invention, the operating pressure on the MEA in a working fuel cell may be greater than Pt, since the gasket described herein provides for target compression Ct % to be achieved at pressures greater than Pt.

Any suitable catalyst may be used in the practice of the present invention. Typically, carbon-supported catalyst particles are used. Typical carbon-supported catalyst particles are 50-90% carbon and 10-50% catalyst metal by weight, the catalyst metal typically comprising Pt for the cathode and Pt and Ru in a weight ratio of 2:1 for the anode. Typically, the catalyst is applied to the PEM or to the FTL in the form of a catalyst ink. The catalyst ink typically comprises polymer electrolyte material, which may or may not be the same polymer electrolyte material which comprises the PEM. The polymer electrolyte is typically an acid-functional fluoropolymer, such as Nafion® (DuPont Chemicals, Wilmington Del.) and Flemion™ (Asahi Glass Co. Ltd., Tokyo, Japan). The polymer electrolytes useful in inks for use in the present invention are typically copolymers of tetrafluoroethylene and one or more fluorinated, acid-functional comonomers. Typically the polymer electrolyte bears sulfonate functional groups. Most typically the polymer electrolyte is Nafion®. The polymer electrolyte typically has an equivalent weight of 1200 or less, more typically 1100 or less, more typically 1050 or less, and most typically about 1000. The catalyst ink typically comprises a dispersion of catalyst particles in a dispersion of the polymer electrolyte. The ink typically contains 5-30% solids (i.e. polymer and catalyst) and more typically 10-20% solids. The electrolyte dispersion is typically an aqueous dispersion, which may additionally contain alcohols and polyalcohols such a glycerin and ethylene glycol. The water, alcohol, and polyalcohol content may be adjusted to alter rheological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency.

The catalyst may be applied to the PEM or the FTL by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

Figure 2:
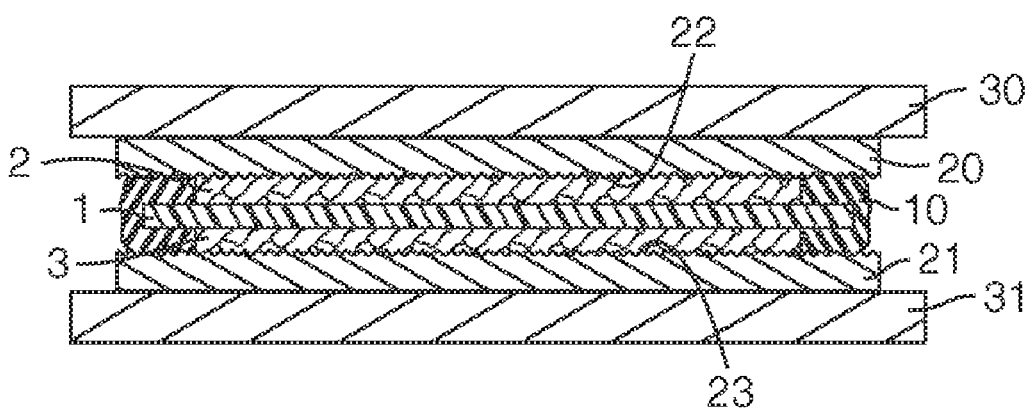
FIG. 2 is a schematic depiction of a cross-section of a membrane electrode assembly during pressing according to the method of the present invention.

With reference to FIGS. 1 and 2, the MEA according to the present invention comprises five layers, in the following order: an anode-side fluid transport layer (2), a thin layer of anode catalyst material (not shown), a polymer electrolyte membrane (1), a thin layer of cathode catalyst material (not shown), and a cathode-side fluid transport layer (3). Each catalyst layer contacts the PEM and one of the FTL's. Typically the fluid transport layers (2,3) do not extend to the outer edge of the polymer electrolyte membrane (1). Typically, the catalyst layers do not extend beyond the perimeter of their respective FTL's (2, 3). While FIGS. 1 and 2 each represent a cross-section of an MEA according to the present invention, it will be readily understood that MEA's according to the present invention will typically have similar edges on each side.

In the method according to the present invention, these five components of the MEA (PEM, two FTL's and two catalyst layers) are positioned between the platens (30,31) of a press, as depicted in FIG. 1. Optionally, patterning plates (20,21), which bear a negative relief of a raised-ridge microstructured contact pattern (22,23), may be positioned between one or both platens (30, 31) of said press and the gasket material (10) in order to form a raised-ridge microstructured contact pattern on the contact face of each gasket.

A gasket material (10) is deposited in the outer edge portions of the anode and cathode faces of the PEM. It will be understood that the layers and materials positioned between the platens (30,31) are typically deposited in order from bottom to top. As depicted in FIG. 2, this construction is then compressed to a pressing pressure Pp which is between 90% and 110% of Pt; more typically between 95% and 105% of Pt; and most typically equal to Pt. Typically, heat is also applied. The gasket material is then substantially fixed so as to form gaskets of a height optimized to the characteristics of it's neighboring fluid transport layer (FTL). The anode-side and cathode-side gasket material (10) may join around the outer perimeter of the PEM (1), as depicted in FIG. 2, or they may remain separate on their respective sides of the PEM (1).

It will be understood that the FTL material will rebound when pressure is removed, whereas the gasket material, having been fixed in a given shape during the application of pressure, will not substantially rebound. Therefore, the FTL is typically taller than the average height (thickness) of the corresponding gasket, although peaks in the pattern of a microstructured gasket may be taller than the FTL. Typically, the gasket height (Tg) will remain close to the height of the fluid transport layer at Ct %, i.e., Tf×(100%−Ct %), where Tf is the average thickness of the fluid transport layer. Typically, Tg will be within 90-110% of Tf×(100%−Ct %) and more typically Tg will be within 95-105% of Tf×(100%−Ct %). Tg and Tf refer to the thickness of the gasket and the FTL, respectively, on a single side of the MEA.

Any suitable gasket material may be used, including thermoplastic materials and curable materials. The elastomeric gasket material is typically not electrically conductive. The gasket material is typically selected from rubbers such as ethylene propylene diene monomer rubber (EPDM rubber) or butyl rubber, or silicones; and is most typically silicone. Curing materials are substantially fixed when they are substantially cured. Substantially cured typically means cured to a degree such that the gasket material will maintain a stable shape in the absence of external force. More typically, substantially cured means essentially completely cured. A further curing step may follow. Thermoplastic elastomers and elastomeric adhesives may also be used as gasket materials. Thermoplastic materials are substantially fixed when they are cooled below Tg.

Suitable pressing temperatures and durations are determined with reference to the materials in use. Typically, Pt is between 1 and 3 MPa, more typically between 1 and 2 MPa, and most typically about 1.7 MPa. Typical pressing temperatures are between 80° C. and 150° C., more typically between 120° C. and 140° C. and most typically about 132° C. Typical pressing durations are between 1 minute and 15 minutes, more typically between 3 and 8 minutes, and most typically about 5 minutes.

The gasket may be of any suitable width. The gasket width may vary around the circumference of an MEA. The gasket portion of the MEA may accommodate holes cut perpendicular to the plane of the MEA. The MEA may have any suitable perimeter shape. The material of each gasket may be impregnated into the outer edge portions of the respective FTL. Typically, the edged of the MEA thus formed are trimmed by any suitable method so that that the outer perimeter of each gasket will be co-extensive with the outer perimeter of the PEM.

Figure 3A:
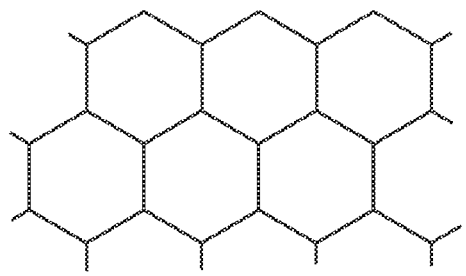
FIGS. 3a and 3b depict hexagonal patterns useful in the practice of the present invention.
Figure 3B:
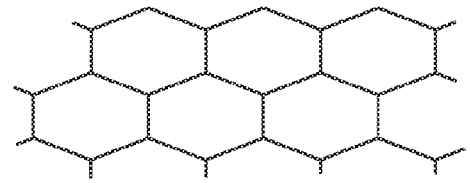
Figure 4A:
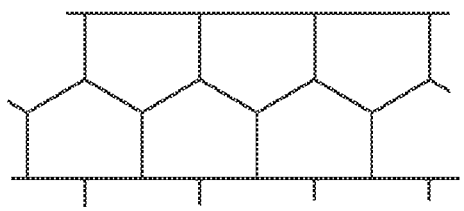
FIGS. 4a and 4b depict degenerate hexagonal patterns useful in the practice of the present invention.
Figure 4B:
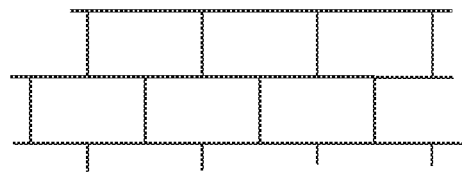

The gasket may comprise a raised-ridge microstructured contact pattern. The raised-ridge microstructured contact pattern typically comprises ridges which meet at joining points, wherein no more than three ridges meet at any one joining point. The raised-ridge microstructured contact pattern according to the present invention is advantageously a hexagonal pattern, which may include the patterns depicted in FIGS. 3a and 3b, or a degenerate hexagonal pattern, which may include the patterns depicted in FIGS. 4a and 4b. The raised-ridge microstructured contact pattern according to the present invention is advantageously composed of cells so as to localize and prevent spread of any leakage. A pattern composed of cells also allows multiple holes to be cut in the gasket portion of the MEA, perpendicular to the plane of the MEA, without opening connecting passages between the holes. It will be understood that the contact surface according to the present invention is made of an elastomeric material that is not significantly compressible, but which is formed into shapes that deform under pressure to seal. The contact pattern will advantageously allow room for the elastomeric material to migrate under pressure, even where the ridges meet at joining points. In an MEA according to the present invention, the maximum deformability of ridges in a pattern composed of cells is maintained by limiting the number of ridges meeting at any one joining point to three, the minimum allowed by geometry.

The ridges that comprise the raised-ridge microstructured contact pattern typically have an unladen width of less than 1,000 micrometers, more typically less than 600 micrometers, and most typically less than 300 micrometers, and typically have a depth (height) of no more than 250 micrometers, more typically less than 150 micrometers, and most typically less than 100 micrometers.

The MEA according to the present invention comprises: a) a polymer electrolyte membrane, b) an anode catalyst material; c) a cathode catalyst material; d) an anode-side fluid transport layer comprising a fluid transport layer sheet material, e) a cathode-side fluid transport layer comprising said fluid transport layer sheet material; f) an anode-side gasket having a contact face; and g) a cathode-side gasket having a contact face; where the fluid transport layer sheet material is characterized by a target compression $Ct\%$; wherein the average thickness of each gasket $Tg$ under its contact face is between 110% and 90% of $\{Tf \times (100\% - Ct\%)\}$, where $Tf$ is the average thickness of the respective same-side fluid transport layer, and more typically $Tg$ is between 105% and 95% of $\{Tf \times (100\% - Ct\%)\}$. As described above, contact faces of the gaskets may bear raised-ridge microstructured contact patterns, typically comprising ridges which meet at joining points wherein no more than three ridges meet at any one joining point, such as hexagonal and degenerate hexagonal patterns. The height of a microstructured contact surface is addressed in terms of the average height of the surface. It will be understood that, under deforming pressure, the height of the patterned surface will approach its average height. The gaskets may comprise materials noted above, more typically selected from: ethylene propylene diene monomer rubber (EPDM rubber), butyl rubber, and most typically silicone.

During use in a fuel cell, the MEA according to the present invention will achieve optimal compression of FTL layers under a wide range of applied pressures greater than Pt.

This invention is useful in the manufacture and operation of fuel cells.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A method of making a gasketed fuel cell membrane electrode assembly comprising the steps of:
   i) selecting a fluid transport layer sheet material;
   ii) selecting $Ct\%$ for said fluid transport layer sheet material, wherein $C\%$ is compression in thickness of said fluid transport layer sheet material as a percent of uncompressed thickness and $Ct\%$ is the target level of $C\%$ during use of said fluid transport layer sheet material in a fuel cell membrane electrode assembly;
   iii) measuring the pressure $Pt$ for which said fluid transport layer sheet material achieves compression of $Ct\%$;
   iv) positioning between the platens of a press a membrane electrode assembly comprising:
      a) a polymer electrolyte membrane having an anode face with an outer edge portion, a cathode face with an outer edge portion, and an outer perimeter;
      b) An anode catalyst material in contact with at least a portion of the anode face of said polymer electrolyte membrane;
      c) A cathode catalyst material in contact with at least a portion of the cathode face of said polymer electrolyte membrane;
      d) an anode-side fluid transport layer comprising said fluid transport layer sheet material, said anode-side fluid transport layer being in contact with said layer of anode catalyst material, said anode-side fluid transport layer not extending over the outer edge portion of the anode side of said polymer electrolyte membrane;
      e) a cathode-side fluid transport layer comprising said fluid transport layer sheet material, said cathode-side fluid transport layer being in contact with said layer of cathode catalyst material, said cathode-side fluid transport layer not extending over the outer edge portion of the cathode side of said polymer electrolyte membrane;
   v) depositing a gasket material in the outer edge portions of the anode and cathode faces of said polymer electrolyte membrane;
   vi) compressing said membrane electrode assembly to a pressing pressure $Pp$ which is between 90% and 110% of $Pt$; and
   vii) substantially fixing said gasket material so as to form a gasketed fuel cell membrane electrode assembly.

2. The method according to claim 1 wherein pressing pressure $Pp$ is between 95% and 105% of $Pt$.

3. The method according to claim 1 additionally comprising the step of:
   viii) positioning one or two patterning plates, which bear a negative relief of a raised-ridge microstructured contact pattern, between one or both platens of said press and said gasket material.

4. The method according to claim 3 wherein said raised-ridge microstructured contact pattern comprises ridges which meet at joining points, wherein no more than three ridges meet at any one joining point.

5. The method according to claim 4, wherein said raised-ridge microstructured contact pattern is a hexagonal pattern.

6. The method according to claim 4, wherein said raised-ridge microstructured contact pattern is a degenerate hexagonal pattern.

7. The method according to claim 3 wherein said gasket material is selected from the group consisting ethylene propylene diene monomer rubber (EPDM rubber), butyl rubber, and silicone.

8. The method according to claim 7 wherein said elastomeric gasket material comprises silicone.

9. The method according to claim 4 wherein said gasket material is selected from the group consisting ethylene propylene diene monomer rubber (EPDM rubber), butyl rubber, and silicone.

10. The method according to claim 9 wherein said elastomeric gasket material comprises silicone.

11. A gasketed fuel cell membrane electrode assembly made according to the method of claim 1.

12. A gasketed fuel cell membrane electrode assembly made according to the method of claim 2.

13. A gasketed fuel cell membrane electrode assembly made according to the method of claim 3.

14. A gasketed fuel cell membrane electrode assembly made according to the method of claim 4.

15. A gasketed fuel cell membrane electrode assembly made according to the method of claim 5.

16. A gasketed fuel cell membrane electrode assembly made according to the method of claim 6.

17. A gasketed fuel cell membrane electrode assembly made according to the method of claim 7.

18. A gasketed fuel cell membrane electrode assembly made according to the method of claim 8.

19. A gasketed fuel cell membrane electrode assembly made according to the method of claim 9.

20. A gasketed fuel cell membrane electrode assembly made according to the method of claim 10.

21. A gasketed fuel cell membrane electrode assembly comprising:
  a) a polymer electrolyte membrane having an anode face with an outer edge portion, a cathode face with an outer edge portion, and an outer perimeter;
  b) An anode catalyst material in contact with at least a portion of the anode face of said polymer electrolyte membrane;
  c) A cathode catalyst material in contact with at least a portion of the cathode face of said polymer electrolyte membrane;
  d) an anode-side fluid transport layer comprising a fluid transport layer sheet material, said anode-side fluid transport layer being in contact with said layer of anode catalyst material, said anode-side fluid transport layer not extending to the outer perimeter of said polymer electrolyte membrane;
  e) a cathode-side fluid transport layer comprising said fluid transport layer sheet material, said cathode-side fluid transport layer being in contact with said layer of cathode catalyst material, said cathode-side fluid transport layer not extending to the outer perimeter of said polymer electrolyte membrane;
  f) an anode-side gasket extending over the outer edge portion of the anode side of said polymer electrolyte membrane, said anode-side gasket having a contact face; and
  g) a cathode-side gasket extending over the outer edge portion of the cathode side of said polymer electrolyte membrane, said cathode-side gasket having a contact face;
  wherein said fluid transport layer sheet material is characterized by a target compression Ct %, wherein C % is the reduction in thickness of a material as a percent of uncompressed thickness and Ct % is the target level of C % during use of said fluid transport layer sheet material in a fuel cell membrane electrode assembly;
  wherein the average thickness of each gasket Tg under its contact face is between 110% and 90% of $\{Tf \times (100\% - Ct\%)\}$, where Tf is the average thickness of the respective same-side fluid transport layer.

22. The gasketed fuel cell membrane electrode assembly according to claim 21 wherein the average thickness of each gasket Tg under its contact face is between 105% and 95% of $\{Tf \times (100\% - Ct\%)\}$, where Tf is the average thickness of the respective same-side fluid transport layer.

23. The gasketed fuel cell membrane electrode assembly according to claim 21 wherein at least a portion of the contact face of each of said gaskets bears a raised-ridge microstructured contact pattern.

24. The gasketed fuel cell membrane electrode assembly according to claim 23 wherein said raised-ridge microstructured contact pattern comprises ridges which meet at joining points, wherein no more than three ridges meet at any one joining point.

25. The gasketed fuel cell membrane electrode assembly according to claim 24, wherein said raised-ridge microstructured contact pattern is a hexagonal pattern.

26. The gasketed fuel cell membrane electrode assembly according to claim 25, wherein said raised-ridge microstructured contact pattern is a degenerate hexagonal pattern.

27. The gasketed fuel cell membrane electrode assembly according to claim 23 wherein said gasket material is selected from the group consisting ethylene propylene diene monomer rubber (EPDM rubber), butyl rubber, and silicone.

28. The gasketed fuel cell membrane electrode assembly according to claim 27 wherein said elastomeric gasket material comprises silicone.

29. The gasketed fuel cell membrane electrode assembly according to claim 24 wherein said gasket material is selected from the group consisting ethylene propylene diene monomer rubber (EPDM rubber), butyl rubber, and silicone.

30. The gasketed fuel cell membrane electrode assembly according to claim 29 wherein said elastomeric gasket material comprises silicone.

31. A fuel cell comprising a gasketed fuel cell membrane electrode assembly according to claim 11, wherein said gasketed fuel cell membrane electrode assembly is compressed to a pressure greater than Pt %.

32. A fuel cell comprising a gasketed fuel cell membrane electrode assembly according to claim 13, wherein said gasketed fuel cell membrane electrode assembly is compressed to a pressure greater than Pt %.

33. A fuel cell comprising a gasketed fuel cell membrane electrode assembly according to claim 14, wherein said gasketed fuel cell membrane electrode assembly is compressed to a pressure greater than Pt %.

34. A fuel cell comprising a gasketed fuel cell membrane electrode assembly according to claim 17, wherein said gasketed fuel cell membrane electrode assembly is compressed to a pressure greater than Pt %.

35. A fuel cell comprising a gasketed fuel cell membrane electrode assembly according to claim 19, wherein said gasketed fuel cell membrane electrode assembly is compressed to a pressure greater than Pt %.

36. A fuel cell comprising a gasketed fuel cell membrane electrode assembly according to claim 21, wherein said gasketed fuel cell membrane electrode assembly is compressed to a pressure greater than Pt %.

37. A fuel cell comprising a gasketed fuel cell membrane electrode assembly according to claim 23, wherein said gasketed fuel cell membrane electrode assembly is compressed to a pressure greater than Pt %.

38. A fuel cell comprising a gasketed fuel cell membrane electrode assembly according to claim 24, wherein said gasketed fuel cell membrane electrode assembly is compressed to a pressure greater than Pt %.

39. A fuel cell comprising a gasketed fuel cell membrane electrode assembly according to claim 27, wherein said gasketed fuel cell membrane electrode assembly is compressed to a pressure greater than Pt %.

40. A fuel cell comprising a gasketed fuel cell membrane electrode assembly according to claim 29, wherein said gasketed fuel cell membrane electrode assembly is compressed to a pressure greater than Pt %.

* * * * *